(12) United States Patent
Hsieh et al.

(10) Patent No.: US 6,288,176 B1
(45) Date of Patent: Sep. 11, 2001

(54) AGENT FOR BLOCKING POLYISOCYANATES, POLYISOCYANATES BLOCKED THEREWITH, AND COATING COMPOSITIONS COMPRISING THESE BLOCKED POLYISOCYANATES

(75) Inventors: Bing Hsieh; Silke Przybilla; Ingeborg Grempels; Walter Jouck; Hardy Reuter; Dagmar Schemschat, all of Münster; Oliver Johannpoetter, Greven; Walburga Kathmann; Adam Stals, both of Münster, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/289,408

(22) Filed: Apr. 9, 1999

(30) Foreign Application Priority Data

Apr. 15, 1998 (DE) .............................................. 198 16 626

(51) Int. Cl.⁷ .......................... C08F 283/10; C08G 59/14; C08L 63/00; C09K 3/00
(52) U.S. Cl. ...................... 525/528; 252/182.2; 523/428; 524/901; 525/124; 525/458
(58) Field of Search ..................................... 525/528, 124, 525/458; 252/182.2; 523/428; 524/901

(56) References Cited

U.S. PATENT DOCUMENTS

| | | | |
|---|---|---|---|
| 4,711,917 | * 12/1987 | McCollum et al. | 525/528 X |
| 4,920,162 | * 4/1990 | Clark et al. | 523/428 X |
| 4,946,910 | * 8/1990 | Savino et al. | 525/458 X |
| 5,070,149 | * 12/1991 | DeBroy et al. | 525/528 X |
| 5,086,090 | 2/1992 | Geist et al. . | |
| 5,410,001 | 4/1995 | Ott et al. . | |
| 5,587,426 | * 12/1996 | Yukawa et al. | 252/182.2 X |
| 5,837,794 | * 11/1998 | Slack et al. | 525/458 X |

FOREIGN PATENT DOCUMENTS

| | | | |
|---|---|---|---|
| 35 18 732 A1 | 5/1985 | (DE) | C08G/59/14 |
| 35 18 770 A1 | 5/1985 | (DE) | C08G/59/14 |
| 0 004 090 A2 | 3/1979 | (EP) | C25D/13/06 |
| 0 012 463 A1 | 11/1979 | (EP) | C09D/5/40 |
| 0 206 071 A2 | 6/1986 | (EP) | C08G/18/80 |
| 0 262 069 A2 | 6/1987 | (EP) | C09D/5/44 |
| 0 536 166 B1 | 5/1991 | (EP) | C09D/5/44 |

\* cited by examiner

Primary Examiner—Richard D. Lovering

(57) ABSTRACT

An agent for the single-stage full blocking of polyisocyanates comprises or consists of an alcohol mixture A) comprising a) furfuryl alcohol or substituted furfuryl alcohols in an amount corresponding to from 60 to 90, in particular from 65 to 85, mol % of hydroxyl groups and b) at least one monoalcohol in an amount corresponding to at least 2 mol % of hydroxyl groups, based in each case on the total amount of hydroxyl groups in components a) and b). In addition, the alcohol mixture A) may also include at least one aliphatic polyol c) of low molecular mass with a functionality of three and/or more in an amount corresponding to at least 5 mol % of hydroxyl groups, based on the total amount of hydroxyl groups in components a), b) and c). In this case component b) can have a molecular weight of <163 g/mol. In a single stage, the blocking agent yields fully blocked polyisocyanates having a low crystallization tendency that are suitable as crosslinking agents in coating compositions, especially in cathodically depositable electrodeposition coating materials.

42 Claims, No Drawings

AGENT FOR BLOCKING POLYISOCYANATES, POLYISOCYANATES BLOCKED THEREWITH, AND COATING COMPOSITIONS COMPRISING THESE BLOCKED POLYISOCYANATES

BACKGROUND OF THE INVENTION

The present invention relates to a novel agent for blocking polyisocyanates. The present invention also relates to novel blocked polyisocyanates produced with the aid of the novel agent. Last but not least, the invention relates to novel coating compositions comprising the novel blocked polyisocyanates.

Here and below, the term "blocking" denotes the reversible reaction of isocyanate groups with appropriate compounds, such as hydroxyfunctional compounds, for example, to form groups which when heated release the blocking agent and the isocyanate groups. The latter are then available again for crosslinking reactions in the coating compositions. The reversal of blocking is also widely known as deblocking.

On grounds of energy, cost and a process regime which does not subject the object to be coated—a car body, for instance—to excessive thermal loading the aim is to use fully blocked polyisocyanates which effect complete crosslinking of the coating compositions at comparatively low temperatures, i.e., at or below 150° C., and in a comparatively short time, i.e., during 10 to 30 minutes.

Patents EP-A-0 206 071 and U.S. Pat. No. 5,086,090 disclose for this purpose blocking the polyisocyanates with furfuryl alcohol. However, the polyisocyanates blocked with this agent have an extremely great tendency to crystallize, which in electrodeposition coating materials in particular is manifested to disadvantage by the formation of unwanted precipitates after just a short time of standing. This occurs in particular with fully blocked diphenylmethane diisocyanates, which are used with preference in electrodeposition coating materials on account of their advantageous technological properties: in particular, their yellowing stability.

The disadvantageous great tendency to crystallize can be countered to a certain degree by subjecting the polyisocyanates to only partial blocking with furfuryl alcohol in a first stage before carrying out full blocking of the resultant partially blocked polyisocyanate with trimethylolpropane in a second stage. A disadvantage of this conventional process is the additional step, which requires additional expenditure on monitoring, time and energy. Furthermore, trimethylolpropane is a solid and must be added either as a melt or as a powder, either option being comparatively laborious.

It is an object of the present invention to provide a novel, furfuryl alcohol-based blocking agent which permits the simple, elegant and full blocking of polyisocyanates in one stage and results in novel fully blocked polyisocyanates having a very small tendency to crystallize and a comparatively low deblocking temperature. A further object of the present invention is to provide novel coating compositions, especially electrodeposition coating materials, which no longer have the disadvantages of the prior art but instead exhibit no unwanted precipitation even on long times of standing, lend themselves to thermal crosslinking at comparatively low temperatures, and result in coatings having an outstanding profile of performance properties and, in particular, no yellowing tendency.

SUMMARY OF THE INVENTION

Accordingly, a novel agent has been found for the single-stage full blocking of polyisocyanates, which consists of or comprises a mixture A) of at least two alcohols, the alcohol mixture A) comprising a) furfuryl alcohol or substituted furfuryl alcohols in an amount corresponding to from 60 to 90, in particular from 65 to 85, mol % of hydroxyl groups, based on the total amount of hydroxyl groups in components a) and b), and b) at least one monoalcohol in an amount corresponding to at least 2 mol % of hydroxyl groups, based on the total amount of hydroxyl groups in components a) and b).

DETAILED DESCRIPTION OF THE INVENTION

In the text below the novel agent for the single-stage full blocking of polyisocyanates is referred to for short as "blocking agent of the invention".

Accordingly, the novel single-stage process for the full blocking of polyisocyanates is referred to as "process of the invention".

In the light of the prior art it was surprising that the achievement of the object on which the present invention is based could be achieved with the aid of the blocking agent of the invention and process of the invention. This is all the more surprising in view of the fact that conventional blocking processes for polyisocyanates, which aim to reduce the crystallization tendency of fully blocked polyisocyanates, especially diphenylmethane diisocyanates, always involve a plurality of stages and are comparatively complex. In this context reference may be made by way of example to patents U.S. Pat. No. 5,410,001 or EP-B-0 536 166, which describe such processes.

The essential constituent of the blocking agent of the invention is the alcohol mixture A). In addition to furfuryl alcohol and/or substituted furfuryl alcohols a) it comprises at least one further monoalcohol b), or consists of these components a) and b).

Examples of suitable substituted furfuryl alcohols to be used in accordance with the invention are those which, on the ring and/or on the methylene carbon, carry groups which do not react with isocyanate groups and so do not disrupt the blocking and crosslinking. Examples of suitable groups of this kind are alkyl, aryl, alkylaryl and/or arylalkyl groups and/or halogen atoms.

In accordance with the invention it is of advantage to use furfuryl alcohol.

Where the alcohol mixture A) which is essential to the invention consists of components a) and b) it is of advantage in accordance with the invention for the monoalcohol or monoalcohols b) to have a molecular weight >163 g/mol. Although for specific purposes it is possible to use monoalcohols b) having lower molecular weights, the advantageous effects of the present invention may then in some circumstances be established reliably only after the alcohol mixture A) has been optimized by means of routine experiments.

Examples of suitable monoalcohols b) with a molecular weight >163 g/mol are monoalkyl ethers of oligomeric polyalkylene glycols, especially the monomethyl, monoethyl, monopropyl, monobutyl and/or monopentyl ethers of tri-, tetra-, penta- and/or hexaethylene glycol, -propylene glycol and/or -butylene glycol.

The alcohol mixture A) which is essential to the invention comprises component a) in an amount corresponding to from 60 to 90 mol % of hydroxyl groups, based on components a) and b). Although it is possible to use smaller amounts of component a), the deblocking temperature of the blocked polyisocyanates and thus the crosslinking temperature of the corresponding coating compositions may in that case rise again. If higher amounts of component b) are used it may no longer be possible to control the crystallization tendency of the resulting blocked polyisocyanates in the desired manner. Therefore, the stated range of amounts is an optimum within which the advantages of the invention are reliably established. Within this range, that from 65 to 85 mol % should be highlighted, since alcohol mixtures A) comprising that amount of component a) give particularly outstanding results.

The alcohol mixture A) which is essential to the invention comprises component b) in an amount which corresponds to at least 2 mol % of hydroxyl groups, based on the total amount of hydroxyl groups in components a) and b).

In the variant of the blocking agent of the invention that is described above, in which the alcohol mixture A) consists of components a) and b), component b) is present therein in an amount corresponding to from 10 to 40 and, in particular, from 15 to 35 mol %.

In a further, advantageous variant of the blocking agent of the invention and of the process of the invention the alcohol mixture A) which is essential to the invention comprises not only components a) and b) but also at least one aliphatic polyol c) which is of low molecular mass and has a functionality of three and/or more.

Examples of suitable components c) to be used in accordance with the invention are glycerol, trimethylolethane, trimethylolpropane, trimethylolhexane, pentaerythritol and/or dipentaerythritol, especially trimethylolpropane.

In the advantageous variant of the alcohol mixture A) which is essential to the invention component c) is present in an amount corresponding to at least 5 mol % of hydroxyl groups, based on the total amount of hydroxyl groups in components a), b) and c). Although smaller amounts could be used, the particular advantages of the corresponding blocking agent and of the corresponding process are in that case established only after further optimization by means of routine experiments.

The upper limit of the amount of component c) corresponds to 38 mol % of hydroxyl groups, based on the total amount of hydroxyl groups in components a), b) and c).

Accordingly, the advantageous variant of the alcohol mixture A) which is essential to the invention, based in each case on the total amount of hydroxyl groups in components a), b and c), comprises the components a) in an amount corresponding to from 60 to 90 mol % of hydroxyl groups, b) in an amount corresponding to from 2 to 35 mol % of hydroxyl groups, and c) in an amount corresponding to from 5 to 38 mol %, the percentages of course adding up in each case to 100 mol %.

In accordance with the invention it is of advantage in this context for the alcohol mixture A) to comprise component b) in an amount corresponding to at least 10 and preferably to at least 15 mol % of hydroxyl groups, based on the total amount of hydroxyl groups in components a), b) and c)

This further, advantageous variant of the blocking agent of the invention results in the particular advantage that as component b) it is possible to use monoalcohols having a molecular weight <163 g/mol.

Accordingly, suitable alcohols are all monoalcohols of low molecular mass, viz. C1 to C20 monoalcohols, especially methanol and/or ethanol and/or isomers of propanol, pentanol, hexanol, heptanol, octanol, nonanol and/or decanol, and/or the customary and known fatty alcohols.

Examples of particularly suitable components b) of the specified type are the methyl and/or ethyl ethers of dipropylene glycol, the methyl, ethyl, propyl and/or butyl ethers of diethylene glycol, 1-hydroxy-4,9-dioxadecane, and/or the monomethyl, monoethyl, monopropyl and/or monobutyl ethers of ethylene glycol, propylene glycol and/or butylene glycol. Of these, very particular preference is given to the use of dipropylene glycol methyl ether and/or diethylene glycol butyl ether.

Apart from the above-described alcohol mixture A) which is essential to the invention, the blocking agent of the invention may also include further, customary and known blocking agents in minor amounts. By minor amounts are meant amounts which do not lessen the advantageous effects resulting from the use of the blocking agent of the invention and the process of the invention. In general these amounts are not more than 15% by weight, based on the blocking agent of the invention.

Examples of further, customary and known blocking agents are diols, oximes, monoamines, alkyl acetoacetates, dialkyl malonates, lactams and/or phenols.

In addition, the blocking agent of the invention may also include customary and known, isocyanate-inert solvents and also customary and known catalysts for the blocking reaction and/or customary and known additives, in effective amounts.

The blocking agent and process of the invention are suitable for blocking all customary and known aliphatic, cycloaliphatic, aromatic and/or aromatic/aliphatic polyisocyanates having at least two isocyanate groups in the molecule.

Examples of such polyisocyanates are trimethylene, tetramethylene, pentamethylene and hexamethylene diisocyanate, 1,3-cyclopentane and 1,4-cyclohexane diisocyanate, 1,3- and 1,4-bis(isocyanatomethylene) cyclohexane, 4,4'-dicylcohexyl diisocyanate, m- and/or p-phenylene diisocyanate, 2,4- and/or 2,6-tolylidene diisocyanate, 1,4-xylylidene diisocyanate, isocyanurates of the said polyisocyanates, and also 4,4'-, 2,4'- and/or 2,2'-diphenylmethane diisocyanate (MDI), polymer MDI, the isocyanurates of MDI and/or the uretoneimines of MDI.

Of these MDIs, the products sold under the tradename Desmodur 44 by Bayer AG, Leverkusen, and under the tradenames Basonat A270 or Lupranat M20S by BASF Aktiengesellschaft, Ludwigshafen, are particularly advantageous and are therefore used with particular preference.

In accordance with the invention the reaction of the polyisocyanates with the blocking agent of the invention takes place in one step, i.e., in a so-called one-pot reaction, at temperatures from 30 to 150° C., in particular from 45 to 100° C. In this context it is of advantage in accordance with the invention to introduce the polyisocyanates together with a customary and known urethanization catalyst such as dibutyltin dilaurate and to meter in the blocking agent of the invention under an inert gas.

The fully blocked polyisocyanates prepared in the manner of the invention feature a comparatively low deblocking temperature of 150° C. or less and no longer tend to crystallize. They can therefore be used with advantage as crosslinking agents in coating compositions whose binders comprise oligomers and/or polymers having functional groups which react with isocyanate groups.

Examples of such functional groups are hydroxyl or amino groups, of which the hydroxyl groups are preferred.

Examples of suitable oligomers and polymers are hydroxyl-containing poly(meth)acrylates, polyesters, polyoxyalkylenes, polyurethanes, polyesterurethanes or polyepoxy-amine adducts, as are used in cathodically depositable electrodeposition coating materials.

Coating compositions of this kind find particular application as one-component clearcoats, basecoats, surfacers, primers and electrodeposition coating materials in automotive OEM painting and automotive refinishing. However, they can also be utilized for industrial coating.

The blocking agent of the invention and the fully blocked polyisocyanates prepared with it in the procedure of the invention develop their advantageous effect above all in cathodically depositable electrodeposition coating materials. Here, the crystallization tendency of conventional fully blocked polyisocyanates is manifested to particular disadvantage, since the electrodeposition coating materials are used in very large amounts with very long times of standing.

The composition of cathodically depositable electrodeposition coating materials and the methods of their application are familiar to the person skilled in the art and are described in detail, for example, in the patents EP-A-0 206 071, U.S. Pat. No. 5,086,090, EP-B-0 536 166, U.S. Pat. No. 5,410,001, DE-A-35 18 732, DE-A-35 18 770, EP-A-0 004 090, EP-A-0 012 463 and EP-A-0 262 069.

In the text below the invention is explained further with reference to the Examples and Comparative Experiments.

COMPARATIVE EXAMPLE C1

Preparing a Fully Blocked Polyisocyanate C1 in Two Stages

A reactor equipped with a stirrer, reflux condenser, internal thermometer and inert gas feed line is charged with 13,500 parts of isomers and more highly functional oligomers based on 4,4'-diphenylmethane diisocyanate, having an NCO equivalent weight of 135 g/eq (Lupranat M20S from BASF Aktiengesellschaft; NCO functionality about 2.7; amount of 2,2' isomer less than 5%) (10 isocyanate equivalents) under a nitrogen atmosphere. 17 parts of dibutyltin dilaurate are added and the resulting mixture is heated to 4° C.

The blocking of the isocyanate groups takes place equimolarly by stepwise addition of furfuryl alcohol and dipropylene glycol methyl ether (Dowanol DPM; tradename of the company DOW Chemicals) (sum of the hydroxyl equivalents: 10):

In the first step, 7193 parts of furfuryl alcohol (corresponding to 73 mol % of the hydroxyl groups) are added at a rate such that the product temperature does not exceed 65° C. It may be necessary to effect cooling.

In the second step, 3952 parts of dipropylene glycol methyl ether (molecular weight: 148 g/mol; corresponding to 27 mol % of hydroxyl groups) are added at a rate such that at the end of addition the temperature of the product is 80° C.

Subsequently, the product is heated continuously to 100° C. over the course of 30 minutes and the mixture is subsequently allowed to react at this temperature for 90 minutes. In the course of the subsequent check, NCO groups can no longer be detected. The product is cooled to 70° C. and diluted at the same time with 6165 parts of Solvenon PM (methoxypropanol; tradename of BASF Aktiengesellschaft). The solids content is 80.3% (1 h at 130° C.).

After cooling to room temperature, the fully blocked polyisocyanate C1 starts to crystallize after just one hour.

COMPARATIVE EXAMPLE C2

Preparing a Fully Blocked Polyisocyanate C2 in Three Stages

The same proportions of polyisocyanate (10 isocyanate equivalents) and dibutyltin dilaurate are initially mixed, and heated, under the same conditions as in Comparative Experiment C1.

Blocking takes place in steps. The sum of the hydroxyl equivalents is 10.

In the first step 7193 parts of furfuryl alcohol (corresponding to about 73 mol % of the hydroxyl groups) are added at a rate such that the product temperature does not exceed 65° C.

In the second step 2963 parts of dipropylene glycol methyl ether (corresponding to about 20 mol % of hydroxyl groups) are metered in at a rate such that after the end of the addition the product has reached the temperature of 80° C.

In the third step 298 parts of melted trimethylol propane (corresponding to about 7 mol % of the hydroxyl groups) are added and the reaction mixture is heated at the same time to 100° C. over the course of 30 minutes. It is allowed to react subsequently at this temperature for 90 minutes. In the subsequent check, NCO groups can no longer be detected.

The mixture is cooled to 70° C. and diluted at the same time with 5993 parts of Solvenon PM. Thereafter the solids content is 80.5% (1 h at 130° C.).

After cooling to room temperature, the fully blocked polyisocyanate C2 begins to crystallize after one day.

EXAMPLE 1

The Preparation of a Fully Blocked Polyisocyanate B1 in a Procedure According to the Invention The same proportions of polyisocyanate (10 isocyanate equivalents) and dibutyltin dilaurate are initially mixed, and heated, under the same conditions as in Comparative Experiment C1.

Thereafter, a mixture of furfuryl alcohol and dipropylene glycol methyl ether (sum of the hydroxyl equivalents; regarding the amounts cf. Comparative Experiment C1) is metered in at a rate such that the product temperature does not exceed 100° C. Subsequently the mixture is allowed to react at this temperature for 90 minutes. At the subsequent check, NCO groups can no longer be detected.

The mixture is cooled to 70° C. and diluted at the same time with Solvenon PM, to give a solids content of 80.1% (1 h at 130° C.).

After cooling, the fully blocked polyisocyanate B1 begins to crystallize after seven days.

EXAMPLE 2

The Preparation of a Fully Blocked Polyisocyanate B2 in a Procedure According to the Invention The same proportions of polyisocyanate (10 isocyanate equivalents) and dibutyltin dilaurate are initially mixed, and heated, under the same conditions as in Comparative Experiment C1.

The amounts indicated in Comparative Experiment C2 of furfuryl alcohol, dipropylene glycol methyl ether and trimethylol propane (sum of the hydroxyl equivalents: 10) are metered in and reacted under the conditions of Example 1.

The resultant product is worked up as described in Example 1. This gives a solution of the fully blocked polyisocyanate B2 having a solids content of 80.7% (1 h at 130° C.).

After cooling to room temperature, the polyisocyanate B2 does not begin to crystallize even after four weeks.

EXAMPLES 3 AND 4 AND COMPARATIVE EXPERIMENTS C' AND C4

Preparing Aqueous Binder Dispersions Comprising the Polyisocyanates B1 and B2 (Examples 3 and 4) and the Polyisocyanates C1 and C2 (Comparative Experiments C3 and C4)

1. Preparing the Precursor VP

The water of reaction is removed azeotropically at from 110 to 140° C. from a 70% strength solution of diethylenetriamine in methyl isobutyl ketone. The solution is subsequently diluted with methyl isobutyl ketone until it has an amine equivalent weight of 124 g/eq 2. The Preparation of the Binder Dispersions B3, B4, C3 and C4

In a reactor equipped with a stirrer, reflux condenser, internal thermometer and inert gas feed line, 6134 parts of epoxy resin based on bisphenol A, having an epoxy equivalent weigth (EEW) of 188 g/eq are heated to 125° C. together with 1397 parts of bisphenol A, 334 parts of dodecylphenol, 468 parts of p-cresol and 438 parts of xylene under a nitrogen atmosphere and the mixture is stirred for 10 minutes. It is subsequently heated to 130° C. and 24 parts of N,N-dimethylbenzylamine are added. The reaction mixture is held at 130° C. until the EEW has reached a value of 820 g/eq. Thereafter, 198 parts of butyl glycol and 1267 parts of sec-butanol are added, so that the reaction mixture cools to 100° C.

Directly thereafter, a mixture of 455 parts of the precursor VP (cf. Section 1) and 518 parts of N-methylethanolamine is introduced into the reactor, after which the mixture is thermally conditioned at 100° C. After a further half an hour the temperature is raised to 105° C. and 158 parts of N,N-dimethylaminopropylamine are added. 80 minutes after the addition of the amine 1136 parts of Plastilit 3060 (polypropylene glycol derivative; tradename of BASF Aktiengesellschaft) and 488 parts of propylene glycol phenyl ether are added. The reaction mixture is then cooled.

The reaction described above is repeated three times more.

At 90° C., mixtures of in each case 6057 parts of the polyisocyanates B1 (Example 3), B2 (Example 4), C1 (Comparative Experiment C3) and C2 (Comparative Experiment C4) with in each case 865 parts of methyl isobutyl ketone and in each case 61 parts of the additive K2000 (polyalkyl vinyl ether; tradename of the company Byk Chemie) are added to each of the four reaction mixtures described above.

After 15 minutes in each case, 13,471 parts of the four resulting mixtures are withdrawn and transferred to dispersing vessels, in which they are each admixed with stirring in portions with 687 parts of lactic acid (88% strength in water) dissolved in 2909 parts of deionized water. Subsequently, the resulting aqueous mixtures are homogenized for 20 minutes and then diluted with 14,933 parts of water. The volatile solvents are removed by distillation in vacuo and then replaced by equal amounts of water.

The characteristic data of the resulting four dispersions B3, B4, C3 and C4 are given in the Table.

TABLE

Characteristic data of the dispersions B3, B4, C3 and C4

| Dispersion | C3 | C4 | B3 | B4 |
|---|---|---|---|---|
| Particle size[a] (nm) | >300 | >300 | >250 | 180 |
| Settling stability[b] | unsat. | unsat. | unsat. | sat. |

[a] mass average from photon correlation spectroscopy
[b] unsat. (unsatisfactory): sediment after four weeks' standing
sat. (satisfactory): no sediment after four weeks' standing The other characteristic data for the dispersions vary within the range of error of the determination and are comparable for all four dispersions:

Solids content: 32±1% (1 h at 130° C.)

Base content: 0.79±0.02 meq/g solids

Acid content: 0.60±0.02 meq/g solids pH: 6.4±0.2

EXAMPLE 5

The Preparation of a Cathodically Depositable Electrodeposition Coating Material of the Invention Comprising the Fully Blocked Polyisocyanate B2 of the Invention 1. Preparing a Grinding Resin Solution RL In accordance with Example 1.3 of Patent EP-B-0 505 445 an organic-aqueous grinding resin solution RL is first prepared by reacting in the first stage, 2598 parts of bisphenol A diglycidyl ether (EEW: 188 g/eq), 787 parts of bisphenol A, 603 parts of dodecylphenol and 206 parts of butyl glycol at 1300C in the presence of 4 parts of triphenylphosphine until a EEW of 865 g/eq is reached.

While the mixture is cooling, it is diluted with 849 parts of butyl glycol and 1534 parts of D.E.R. 732 (polypropylene diglycol diglycidyl ether; tradename of the company DOW Chemicals). The resultant mixture is reacted at 90° C. with 266 parts of 2,2'-amino-ethoxyethanol and 212 parts of N,N-dimethylaminopropylamine. After 2 hours the viscosity of the resin solution is constant (5.3 dPa.s; 40% in Solvenon PM; cone and plate viscometer at 23° C.). The solution is diluted with 1512 parts of butyl glycol, the base groups are partially neutralized with 201 parts of glacial acetic acid, and the solution is diluted further with 1228 parts of deionized water.

The result is a 60% aqueous-organic grinding resin solution RL whose 10% dilution has a pH of 6.0.

2. The Preparation of a Gray Pigment Paste PP

For this purpose, first of all 280 parts of water and 250 parts of the above-described grinding resin solution RL (cf. Section 1) are mixed. To the resultant mixture there are added 5 parts of carbon black, 35 parts of basic lead silicate BSWL 202 (tradename of the company Chemag), 90 parts of Extender HEWP R (tradename of the company English China Clay Int., Great Britain), 315 parts of titanium dioxide TI-PURE 900 (tradename of the company DuPont, USA), 5 parts of Bentone R EW (tradename of the company Rheox, Germany) and 20 parts of di-n-butyltin oxide. The mixture is initially dispersed for 30 minutes in a high-speed dissolver-stirrer. The mixture is subsequently dispersed in a small laboratory mill (Motor Mini Mill from Eiger Engineering, Ltd., Great Britain) for 1 to 1.5 h down to a Hegmann fineness of ≧12 and adjusted to processing viscosity with further water. This gives the pigment paste PP, which is stable to demixing.

3. The Preparation of the Electrodeposition Paint 2598 parts of the dispersion B4 of Example 4, 1500 parts of deionized water and 25 parts of a 10 strength aqueous lactic acid solution are mixed. To the resultant mixture there are added, with stirring, 646 parts of the gray pigment paste PP (cf. Section 2). The electrodeposition paint obtained in this way is made up to 5000 parts with deionized water.

4. Application and Testing

After 1 hour of ageing at room temperature the electrodeposition paint (cf. Section 3) is deposited with a drop resistance of 150 ohms onto steel test panels connected as cathode. The panels used for this purpose are water-rinsed zinc-phosphatized steel test panels BO26 W OC from the company Chemetall. The deposition time is 2 minutes at a bath temperature of 30° C. The deposition voltage is chosen so as to give a baked film thickness of about 20 μm.

The deposited paint film is rinsed with deionized water and baked at 175° C. for 20 minutes.

This gives hard paint films having a thickness of 19 μm, very good leveling and very good resistance to solvents (tested by 20 rubs back and forth with a cotton pad soaked with methyl isobutyl ketone).

One coated panel is overcoated in conventional manner with a white automotive topcoat in a film thickness of about 40 μm and is subjected to a conventional yellowing test. The baked white topcoat shows no traces of yellowing at all.

What is claimed is:

1. A blocking agent for the single-stage full blocking of polyisocyanates, comprising a mixture A) comprising
   a) from 60 to 90 mol % of hydroxyl groups, based on the total amount of hydroxyl groups, from one or more alcohols selected from the group consisting of furfuryl alcohol, substituted furfuryl alcohols, and mixtures thereof, and
   b) at least 2 mol % of hydroxyl groups from at least one or more additional monoalcohols.

2. The blocking agent according to claim 1, wherein component b) has a molecular weight of more than 163 g/mol.

3. The blocking agent of claim 1, wherein mixture A) further comprises
   c) at least one aliphatic polyol of low molecular mass with a functionality of three or more, in an amount corresponding to at least 5 mol % of hydroxyl groups, based on the total amount of hydroxy groups in components a), b) and c).

4. The blocking agent according to claim 3, characterized in that component b) has a molecular weight of less than 163 g/mol.

5. The blocking agent of claim 3, characterized in that mixture A) comprises component b) in an amount corresponding to at least 10 mol % of hydroxyl groups, based on the total amount of hydroxyl groups in components a), b) and c).

6. The blocking agent of claim 3, wherein mixture A) comprises the components
   a) in an amount corresponding to from 60 to 90 mol % of the hydroxyl groups,
   b) in an amount corresponding to from 2 to 35 mol % of the hydroxyl groups and
   c) in an amount corresponding to from 5 to 38 mol % of the hydroxyl groups,
based in each case on the total amount of hydroxyl groups in components a), b), and c), with the proviso that the percentages add up to 100 mol %.

7. The blocking agent of claim 3, wherein component c) is selected from the group consisting of glycerol, trimethylolethane, trimethylolpropane, trimethylolhexane, pentaerythritol, dipentaerythritol, and mixtures thereof.

8. The blocking agent of claim 1, wherein mixture A) comprises component b) in an amount corresponding to from 10 to 40 mol % of hydroxyl groups, based on the total amount of hydroxyl groups.

9. The blocking agent of claim 1, comprising one or more members selected from the group consisting of diols, oximes, monoamines, alkyl acetoacetates, dialkyl malonates, lactams, phenols, and mixtures thereof in a minor amount.

10. The blocking agent of claim 1, further comprising one or more members selected from the group consisting of solvents, catalysts, additives, and mixtures thereof in effective amounts.

11. The blocking agent of claim 1, wherein component b) comprises one or more members selected from the group consisting of monomethyl, monoethyl, monopropyl, monobutyl, and monopentyl ethers of triethylene, tetraethylene, pentaethylene, hexaethylene, tripropylene, tetrapropylene, pentapropylene, hexapropylene, tributylene, tetrabutylene, pentabutylene, and hexabutylene glycols, and mixtures thereof.

12. The blocking agent of claim 1, wherein component b) is selected from the group consisting of the monomethyl and monoethyl ethers of dipropylene glycol, the monomethyl, monoethyl, monopropyl and monobutyl ethers of diethylene glycol, 1-hydroxy-4,9-dioxadecane, the monomethyl, monoethyl, monopropyl, and monobutyl ethers of ethylene glycol, propylene glycol, and butylene glycol, and mixtures thereof.

13. The blocking agent of claim 1, wherein component a) comprises one or more substituted furfuryl alcohols which are substituted on the ring and/or on the methylene carbon by alkyl, aryl alkylaryl and/or arylalkyl groups and/or halogen atoms.

14. A process for the blocking of polyisocyanates comprising
   reacting a polyisocyanate with a blocking agent comprising a mixture A) comprising
      a) from 60 to 90 mol % of hydroxyl groups, based on the total amount of hydroxyl groups of component a), b), and c), from one or more alcohols selected from the group consisting of furfuryl alcohol, substituted furfuryl alcohols, and mixtures thereof,
      b) at least 2 mol % of hydroxyl groups, based on the total amount of hydroxyl groups of component a), b), and c), from at least one or more additional monoalcohols,
      c) optionally, at least one aliphatic polyol having a functionality of three or more,
   wherein the reaction is carried out in one stage.

15. The process according to claim 14, wherein the polyisocyanate is selected from the group consisting of aliphatic cycloaliphatic, aromatic, and aromatic/aliphatic polyisocyanates having at least two isocyanate groups in the molecule, and mixtures thereof.

16. The process of claim 14, wherein the polyisocyanate is selected from the group consisting of 4,4'-, 2,4'- and 2,2'-diphenylmethane diisocyanates (MDI), polymer MDI, the isocyanurates of MDI, the uretoneimines of MDI, and mixtures thereof.

17. The process of claim 14, wherein component b) has a molecular weight of more than 163 g/mol.

18. The process of claim 14, wherein component c) provides at least 5 mol % of hydroxyl groups, based on the total amount of hydroxyl groups in components a), b) and c).

19. The process of claim 18, wherein component c) is selected from the group consisting of glycerol, trimethylolethane, trimethylolpropane, trimethylolhexane, pentaerythritol, dipentaerythritol, and mixtures thereof.

20. The process of claim 14, wherein component b) provides at least 10 mol % of hydroxyl groups, based on the total amount of hydroxyl groups of components a), b), and c).

21. The process of claim 14, wherein mixture A) comprises from 10 to 40 mol % of hydroxyl groups, based on the total amount of hydroxyl groups of component a), b), and c), from component b).

22. The process of claim 14, wherein mixture A) comprises from 2 to 35 mol % of hydroxyl groups from component b) and from 5 to 38 mol % of hydroxyl groups from component c), each based on the total amount of hydroxyl groups of component a), b), and c).

23. The process of claim 14, wherein the blocking agent further comprises one or more members selected from the group consisting of diols, oximes, monoamines, alkyl acetoacetates, dialkyl malonates, lactams, phenols, and mixtures thereof in a minor amount.

24. The process of claim 14, wherein component b) comprises one or more members selected from the group consisting of monomethyl, monoethyl, monopropyl, monobutyl, and monopentyl ethers of triethylene, tetraethylene, pentaethylene, hexaethylene, tripropylene, tetrapropylene, pentapropylene, hexapropylene, tributylene, tetrabutylene, pentabutylene, and hexabutylene glycols, and mixtures thereof.

25. The process of claim 14, wherein component b) is selected from the group consisting of the monomethyl and monoethyl ethers of dipropylene glycol, the monomethyl, monoethyl, monopropyl and monobutyl ethers of diethylene glycol, 1-hydroxy4,9-dioxadecane, the monomethyl, monoethyl, monopropyl, and monobutyl ethers of ethylene glycol, propylene glycol, and butylene glycol, and mixtures thereof.

26. The process of claim 14, wherein component a) comprises one or more substituted furfuryl alcohols that are substituted on at least one of the ring and the methylene carbon by at least one group selected from alkyl groups, aryl groups, alkylaryl groups, arylalkyl groups, and halogen atoms.

27. A fully blocked polyisocyanate having a low crystallization tendency, prepared by the process of claim 14.

28. A method of crosslinking a coating composition, comprising reacting the fully blocked polyisocyanate of claim 17 with at least one binder having one or more functional groups which react with an isocyanate group.

29. A coating composition comprising at least one binder having functional groups which react with isocyanates and at least one fully blocked polyisocyanate of claim 27 as crosslinking agent.

30. The coating composition of claim 29 which is a cathodically depositable electrodeposition coating.

31. A fully blocked polyisocyanate prepared according to the process of claim 16.

32. A fully blocked polyisocyanate prepared according to the process of claim 22.

33. A fully blocked polyisocyanate prepared according to the process of claim 26.

34. A fully blocked polyisocyanate prepared according to the process of claim 27.

35. A fully blocked polyisocyanate prepared according to the process of claim 28.

36. A fully blocked polyisocyanate prepared according to the process of claim 29.

37. A coating composition comprising at least one binder having functional groups that react with isocyanate functionality and at least one fully blocked polyisocyanate according to claim 31.

38. A coating composition comprising at least one binder having functional groups that react with isocyanate functionality and at least one fully blocked polyisocyanate according to claim 32.

39. A coating composition comprising at least one binder having functional groups that react with isocyanate functionality and at least one fully blocked polyisocyanate according to claim 33.

40. A coating composition comprising at least one binder having functional groups that react with isocyanate functionality and at least one fully blocked polyisocyanate according to claim 34.

41. A coating composition comprising at least one binder having functional groups that react with isocyanate functionality and at least one fully blocked polyisocyanate according to claim 35.

42. A coating composition comprising at least one binder having functional groups that react with isocyanate functionality and at least one fully blocked polyisocyanate according to claim 36.

* * * * *